(12) United States Patent
Cho (10) Patent No.: US 7,369,832 B2
(45) Date of Patent: May 6, 2008

(54) RECEIVING DIVERSITY APPARATUS AND METHOD OF MOBILE STATION FOR HIGH DATA RATE TYPE MOBILE COMMUNICATION SYSTEM

(75) Inventor: Nam-Shin Cho, Gyunggi-Do (KR)

(73) Assignee: LG Electronics Inc., Seoul (KR)

(*) Notice: Subject to any disclaimer, the term of this patent is extended or adjusted under 35 U.S.C. 154(b) by 497 days.

(21) Appl. No.: 10/843,572

(22) Filed: May 12, 2004

(65) Prior Publication Data

US 2004/0229588 A1 Nov. 18, 2004

(30) Foreign Application Priority Data

May 13, 2003 (KR) ............... 10-2003-0030269

(51) Int. Cl.
*H04B 1/06* (2006.01)
*H04B 7/00* (2006.01)
(52) U.S. Cl. ............... 455/276.1; 455/277.1; 455/135
(58) Field of Classification Search ............... 455/132, 455/135, 272, 273, 276.1, 278.1, 232.1, 226.1, 455/226.2, 136, 137, 138, 139, 234.1, 277.1
See application file for complete search history.

(56) References Cited

U.S. PATENT DOCUMENTS

| 3,911,364 | A | | 10/1975 | Langseth et al. | |
|---|---|---|---|---|---|
| 4,752,969 | A | * | 6/1988 | Rilling | 455/278.1 |
| 5,203,025 | A | * | 4/1993 | Anvari et al. | 455/134 |
| 6,563,860 | B2 | * | 5/2003 | Schilling | 375/148 |
| 6,661,832 | B1 | * | 12/2003 | Sindhushayana et al. | 375/144 |
| 6,990,137 | B2 | * | 1/2006 | Smee et al. | 375/142 |
| 7,072,628 | B2 | * | 7/2006 | Agashe et al. | 455/140 |
| 7,113,748 | B2 | * | 9/2006 | Shapira et al. | 455/63.4 |
| 2004/0219899 | A1 | * | 11/2004 | Ho et al. | 455/273 |

FOREIGN PATENT DOCUMENTS

| GB | 2 307 830 A | 6/1997 |
|---|---|---|
| JP | 07-154376 | 6/1995 |
| JP | 07-162350 | 6/1995 |
| JP | 09-312602 | 12/1997 |
| JP | 11-252040 | 9/1999 |
| JP | 2000-252895 | 9/2000 |
| JP | 2004-538682 | 12/2004 |
| KR | 1997-0009903 | 6/1997 |
| KR | 1999-0076867 | 10/1999 |
| WO | WO 97/24818 | 7/1997 |
| WO | WO 02/093770 A1 | 11/2002 |

\* cited by examiner

*Primary Examiner*—Edward F. Urban
*Assistant Examiner*—Christian A. Hannon
(74) *Attorney, Agent, or Firm*—Ked & Associates, LLP (57) ABSTRACT

A receiving diversity apparatus and method for a mobile station in an HDR mobile communication system measures C/I values of pilot channels on respective antennas, measures a C/I value of in-phase combined pilot channel, and then selectively performs one of a selection diversity receiving operation and an in-phase combining receiving operation according to the measured C/I values. An optimal diversity receiving status is then maintained according to changes of a presently received pilot channel, and the optimal diversity receiving operation between the selection diversity receiving operation and the in-phase combining diversity receiving operation is selected at a starting point of the pilot channel.

21 Claims, 6 Drawing Sheets

RECEIVING DIVERSITY APPARATUS AND METHOD OF MOBILE STATION FOR HIGH DATA RATE TYPE MOBILE COMMUNICATION SYSTEM

BACKGROUND OF THE INVENTION

1. Field of the Invention

The present invention generally relates to a communication system, and more particularly to a receiving diversity apparatus and method for a mobile station of a mobile communication system.

2. Background of the Related Art

A diversity method is a technology used for improving the quality of a received signal in a wireless communication system. A receiving device in a system applying a diversity method comprises two or more antennas, and respective signals received through the antennas are selected or combined to achieve a received signal quality higher than that of a conventional receiving device which uses one antenna Generally, there are three types of diversity methods: a selection or switching method, an in-phase combining or equal-gain combining method, and a maximal ratio combining method.

(1) Selection or Switching Method.

The selection or switching diversity method (hereinafter, referred to as selection diversity method) selectively receives the strongest signal among signals received through a plurality of antennas.

(2) In-Phase Combining or Equal-Gain Combining Method.

The in-phase combining diversity method controls phases of signals received through the respective antennas to be in-phase. These signals are then combined to form a final received signal. The in-phase combining diversity method therefore combines the signals, and does not select the signal as in the selection diversity method. As a result, an improved quality of the received signal can be achieved When implemented, the in-phase combining diversity method requires a phase shifter for controlling phase of the signal. This method is also able to improve the received signal quality under a static environment, where the strength of the received signal is not changed according to a lapse of time or form a fading environment which may change the strength of the received signal according to the lapse of time.

In the in-phase combining diversity method, if one of the received signals has small electric power compared to other received signals only a small amount gain can be added to the signal component in the final combined output. However, because noise is the same as that of the other signals, the signal-to-noise ratio (SNR) is lowered.

(3) Maximal Ratio Combining Method.

The maximal ratio combining method controls the sizes and independent phases of the respective received signals, and then combines these signals. More specifically, the strengths of the signals received through the antennas are detected, and then the strong signals are amplified and the weak signals attenuated. The signals are then all combined.

Figure 1:
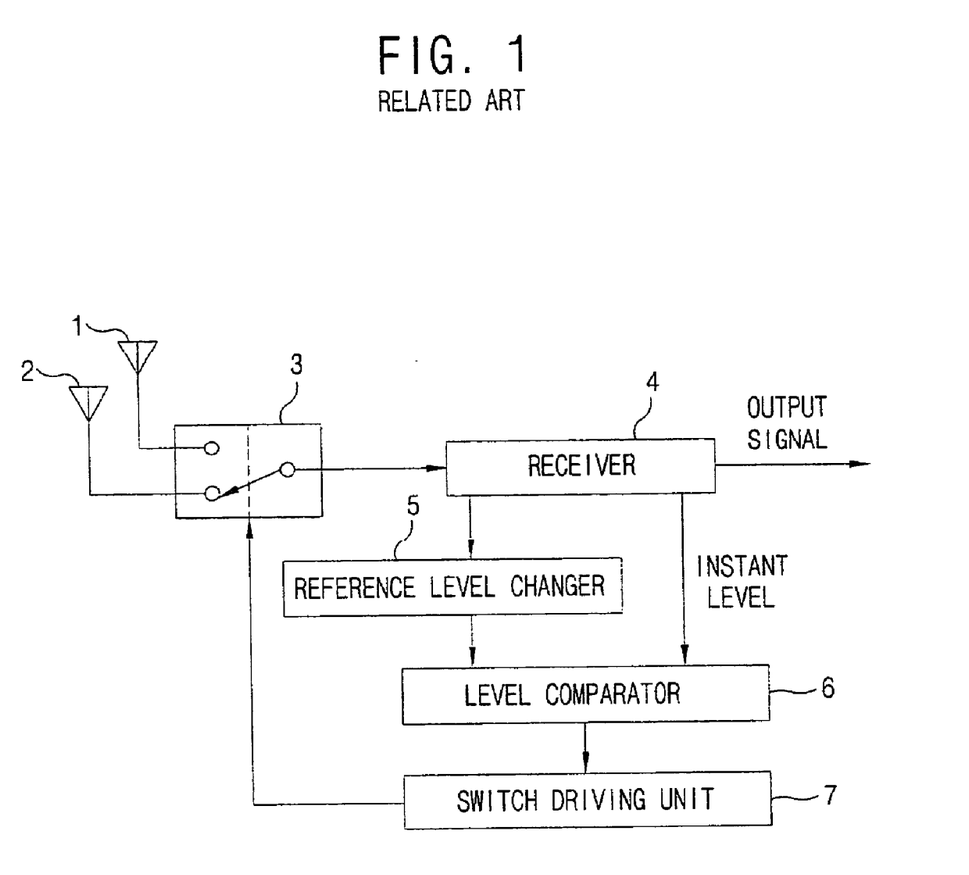
FIG. 1 is a view showing an example of a diversity apparatus configuration which performs a related-art selection diversity method.

FIG. 1 is a view showing an example of an apparatus which performs a related-art selection diversity method. This apparatus comprises an antenna switching unit 3 for selecting one of antennas 1 and 2, a receiver 4 for recovering the received signal passed through the antenna switching unit and for outputting instant level information of the received signal, and a reference level changer 5 for outputting an average value of received signals output from the receiver as an adaptive reference level. The apparatus also includes a level comparator 6 for setting an upper reference level and a lower reference level from the adaptive reference level output from the reference level changer, comparing the instant level of the received signal output from the receiver to the upper reference level and to the lower reference, and for outputting a driving signal according to the comparing result. Finally, a switch driving unit 7 controls switching of the antenna switching unit based on the driving signal output from the level comparator.

In operation, the receiver 4 recovers the signal passed through the antenna switching unit and outputs the instant level information of the received signal. The reference level changer 5 calculates the an average value of the received signals based on the instant level information and outputs the average value as an adaptive reference level. The level comparator 6 sets an upper reference level and a lower reference level from the adaptive reference level output from the reference level changer, compares the instant level of the received signal output from the receiver 4 to the upper and lower reference levels, and outputs a driving signal to the switch driving unit based on a result of the comparison. The switch driving unit controls the switching operation of the antenna switching unit using the driving signal. When the strength of a signal received through one of the antennas is smaller than the reference level, the switch 3 switches to the other antenna for receiving a stronger signal.

Figure 2:
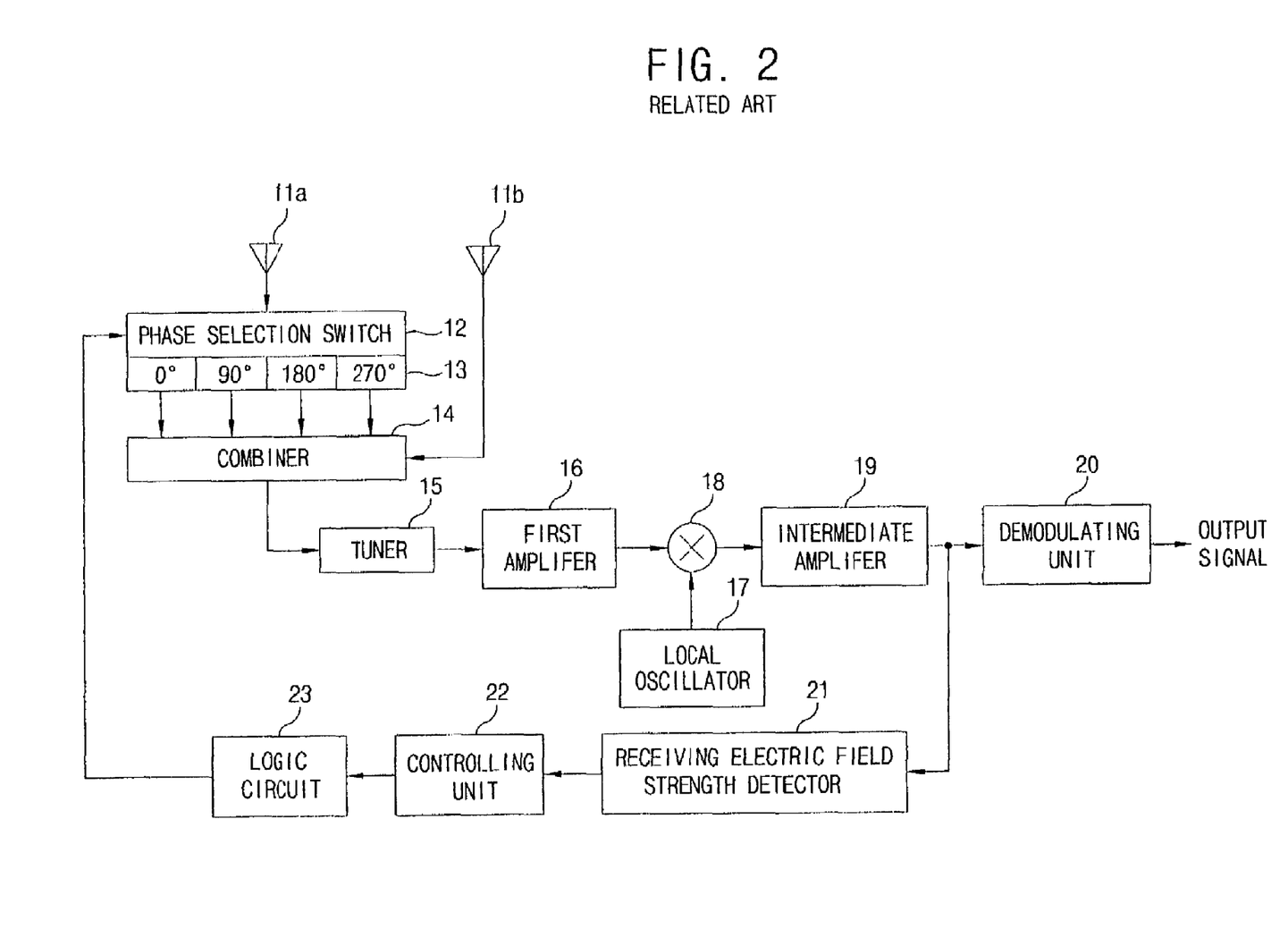
FIG. 2 is a view showing an example of a diversity apparatus configuration which performs a related-art in-phase combining diversity method.

FIG. 2 shows an example of an apparatus which performs a related-art in-phase combining diversity method. This apparatus comprises a phase selecting switch 12 and a phase shifter 13, a combiner 14, a tuner 15, a first amplifier 16, a local oscillator 17, a mixer 18, an intermediate amplifier 19, a demodulator 20, a receiving electric field strength detector 21, a controlling unit 22, and a logic circuit 23.

The phase selecting switch and the phase shifter perform a phase shift for a first signal received through one antenna (first antenna 11a) with a predetermined angle interval. The combiner 14 combines the phase-shifted first signal and a second signal received through a second antenna 11b. Tuner 15 selects the desired signal from the combined signal and the first amplifier 16 amplifies the signal output from the tuner. The local oscillator generates a local oscillating frequency, and the mixer outputs the amplified signal as an intermediate frequency signal using the local oscillating frequency. The intermediate amplifier 19 amplifies the intermediate frequency signal, and the demodulator demodulates the amplified intermediate frequency signal. The receiving electric field strength detector detects the receiving level of the amplified intermediate frequency signal, and the controlling unit compares the detected receiving level to a predetermined reference level to output a resulting value. Finally, the logic circuit outputs a switch control signal to the phase selecting switch based on the resulting value.

In operation, the signal received from the first antenna 11a is phase-shifted at one of 0°, 90°, 180° and 270° angles through the phase selecting switch and the phase shifter. The phase-shifted signal is then in-phase combined with the signal received from the second antenna 11b in the combiner. The combined signal is then converted into an intermediate frequency signal by passing through the tuner, the first amplifier, the mixer, and the intermediate amplifier. The demodulator demodulates the intermediate frequency signal, and then receiving electric field strength detector detects the receiving level of the intermediate frequency signal.

This diversity apparatus shifts the phase regularly so that the largest receiving level can be detected by the receiving electric field strength detector. That is, the controlling unit 22 compares the receiving level detected by the receiving electric field strength detector 21 to the reference level, and controls the phase selecting switch to maintain the present status when the receiving level is larger than the reference level. However, if the receiving level is not larger than the reference level, the controlling unit switches the phase selecting switch to a contact point which corresponds to a next phase angle. The phase-shift operation of the received signal is performed regularly in order to obtain the receiving signal level of larger strength.

Figure 3:
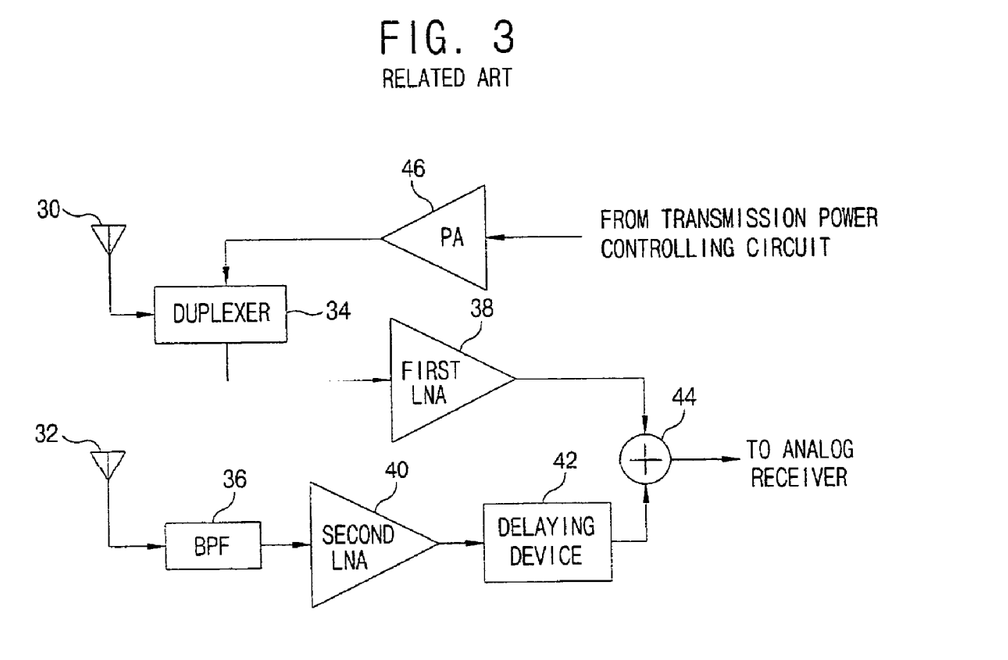
FIGS. 3 and 4 are views showing diversity apparatuses which perform respective related-art maximal ratio combining diversity methods.
Figure 4:
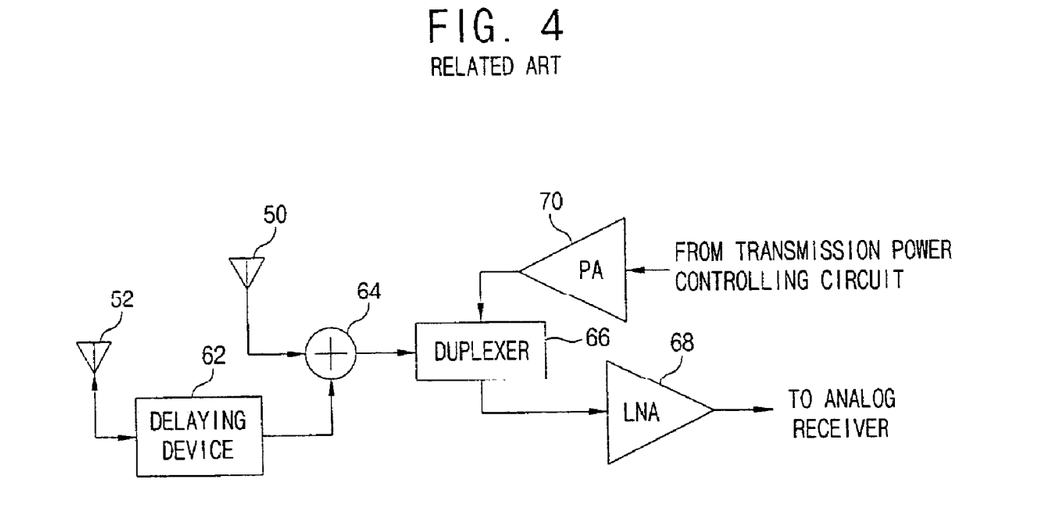

FIGS. 3 and 4 show examples of apparatuses which perform related-art maximal ratio combining diversity methods. These apparatuses time-delay signals received through diversity antennas 32 and 52 using delaying devices 42 and 62, and then the signals are respectively combined with signals received through main antennas 30 and 50 using combiners 44 and 64.

To perform this function, the apparatus uses the characteristics of a CDMA communication system which expands data using one or more PN codes. That is, if the delayed time of the received signal on diversity antennas 32 and 52 generated by the delaying devices larger than one chip period of the PN code, the delayed received signal is uncorrelated with the received signal on the main antennas 30 and 50. Therefore, the received signal of the main antennas and the received signal of the diversity antennas combined in the combiners can be divided again by a rake receiver built in a DMA modem and maximal ratio combined. The diversity apparatus shown in FIG. 3 and the diversity apparatus shown in FIG. 4 have the same diversity receiving operation principles, except that diversity antenna 32 shown in FIG. 3 can only receive while diversity antenna 52 shown in FIG. 4 is able to both receive and transmit.

The diversity apparatus which performs the selection diversity method shown in FIG. 1 is able to achieve better received signal quality than a single-antenna system in a fading environment in which the strength of the received signal is changed according to the lapse of time. However, this apparatus is not able to improve received signal quality in a static environment in which the strength of the received signal is not changed according to a time lapse.

The diversity apparatus which performs the in-phase combining diversity method shown in FIG. 2 has a problem, in that the SNR of the combined signal output to the combiner is lowered which the strengths of the signals received through antennas 11a and 11b are different.

Also, phase shifter 13 and combiner 14 are located on a front end of the first amplifier 16. As a result, signal loss in the signal generated in the phase shifter and combiner increases an entire noise figure of the diversity apparatus. This reduces the receiving sensitivity, and lowers any improvement in the received signal quality that can be realized.

In addition, only the received signal of the first antenna 11a is phase-shifted. Therefore, imbalance between the average electric power of the first antenna and the average electric power of the second antenna is caused, which lowers the diversity receiving function.

The diversity apparatuses which perform the maximal ratio combining diversity method shown in FIGS. 3 and 4 use a delaying device which delays the received signals for at least one chip time of the PN code, or longer. When a PN code having 1 MHz chip rate is used, the delaying device delays at least 1 µs or longer (5 µs~10 µs is desirable in the diversity apparatus shown in FIGS. 3 and 4). A circuit device for delaying an analog signal for more than 1 µs generally has large volume and therefore it is difficult to apply the device to a terminal in a mobile communication system (mobile station). Also, the circuit device generates a significant amount of loss in signal electric power. Consequently, the receiving sensitivity is lowered and imbalance between the average electric power of receiving signals is generated, which lowers the receiving function.

The general diversity apparatus controls diversity based on received signal strength indication (RSSI) information. However, since many base stations transmit signals with different offsets simultaneously in a same frequency band such as in a CDMA system, interference between signals has a profound adverse affects on signal quality. That is, in a CDMA system signal quality can differ as a result of interference from other base stations using a same RSSI value. Therefore, it is difficult to control diversity using the general diversity apparatus.

High data rate (FDR) method is a wireless packet data transmission technology based on CDMA which is able to transmit data in mega-units. If the general diversity apparatus were applied to an HDR mobile communication system, accuracy in signal quality measuring would be substantially lowered. Therefore, it is difficult to control the diversity accurately with related-art methods.

The above references are incorporated by reference herein where appropriate for appropriate teachings of additional or alternative details, features and/or technical background.

SUMMARY OF THE INVENTION

An object of the present invention is to provide an improved apparatus and method which performs receiving diversity in a mobile station of an HDR system, and specifically one which determines an optimal diversity receiving status based on a carrier-to-interference ratio (C/I) of a pilot channel or a preamble signal in a forward radio channel in which the pilot channel or the preamble signal for synchronizing regularly exists.

Another object of the present invention is to provide an apparatus and method which performs receiving diversity in a mobile station of an HDR mobile communication system, which maintains optimal diversity receiving status by performing an in-phase combining diversity receiving operation and a selection diversity receiving operation selectively based on changes of C/I of respective pilot channels passing through a plurality of antennas.

Another object of the present invention is to provide an apparatus and method which performs receiving diversity in a mobile station of an HDR mobile communication system, where in signal quality is improved under a fading environment where strength of a received signal is changed based on a lapse of time and in a static environment where the received signal strength is not changed, by performing an in-phase combining diversity operation and selection diversity operation.

Another object of the present invention is to provide an apparatus and method which performs receiving diversity in a mobile station of an HDR mobile communication system, where in imbalance between average electric power of received signals, caused by phase-shift of a signal of a certain antenna, is removed by performing a phase shift for the received signals of the respective antennas.

Another object of the present invention is to provide an apparatus and method which performs receiving diversity in a mobile station of an HDR mobile communication system, by minimizing affects of signal loss which can happen in a phase shifter and a combiner by connecting the phase shifter and the combiner adjacent an amplifier.

To achieve these and other objects and advantages, the present invention provides in accordance with one embodiment a receiving diversity apparatus for a mobile station in an HDR mobile communication system comprising: a first amplifier for switching a received signal of a first antenna according to a first gain control signal; a second amplifier for switching a received signal of a second antenna according to a second gain control signal; a first phase shifter for shifting phase of an output signal of the first amplifier according to a first phase control signal; a second phase shifter for shifting phase of an output signal of the second amplifier according to a second phase control signal; a combiner for combining output signals of the first and second phase shifters; a received signal processing unit for measuring signal quality of a pilot channel from the output signal of the combiner and controlling optimal diversity receiving according to the signal quality of the pilot channel. The received signal processing unit decides maintaining time of the selected optimal diversity receiving status according to the changed amount of C/I value of the presently received pilot channel.

In accordance with another embodiment, the present invention provides a receiving diversity method for a mobile station in an HDR mobile communication system comprising: a step of measuring signal quality of pilot channels in respective antennas; a step of measuring in-phase combined signal quality of pilot channels of respective antennas by compensated phase differences; a step of selecting optimal diversity receiving status according to the signal quality of the respective pilot channel; and a step of controlling maintaining time of the optimal diversity receiving status according to changed amount of the pilot channel which is presently received.

The step of selecting the optimal diversity receiving status comprises: a step of selecting an antenna having C/I of the largest pilot channel; a step of receiving the received signal from the selected antenna; a step of selecting in-phase combining of a phase shift as much as phase difference corresponding to the C/I value of the largest pilot channel among the C/I value of the in-phase combined pilot channel if the C/I values of the pilot channels on the respective antennas do not have difference larger than a predetermined value; and a step of receiving the received signal through combining after shifting the phase. The optimal diversity receiving status is selected by the interval of the maintaining time, and the selection of optimal diversity receiving status is performed when a starting point of the pilot channel.

In accordance with another embodiment, the present invention provides a receiving diversity method for a mobile station in an HDR mobile communication system comprising: a step of measuring C/I value of a pilot channel of a first antenna; a step of measuring C/I value of pilot channel on a second antenna; a step of receiving a received signal through an antenna having larger pilot channel C/I value (first channel C/I value) between the two, when difference between the C/I values of the two pilot channels is larger than the reference level; and a step of in-phase combining the pilot channels of the first and second antennas when the difference between the C/I values of the two pilot channels is not larger than the reference level.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 5A:
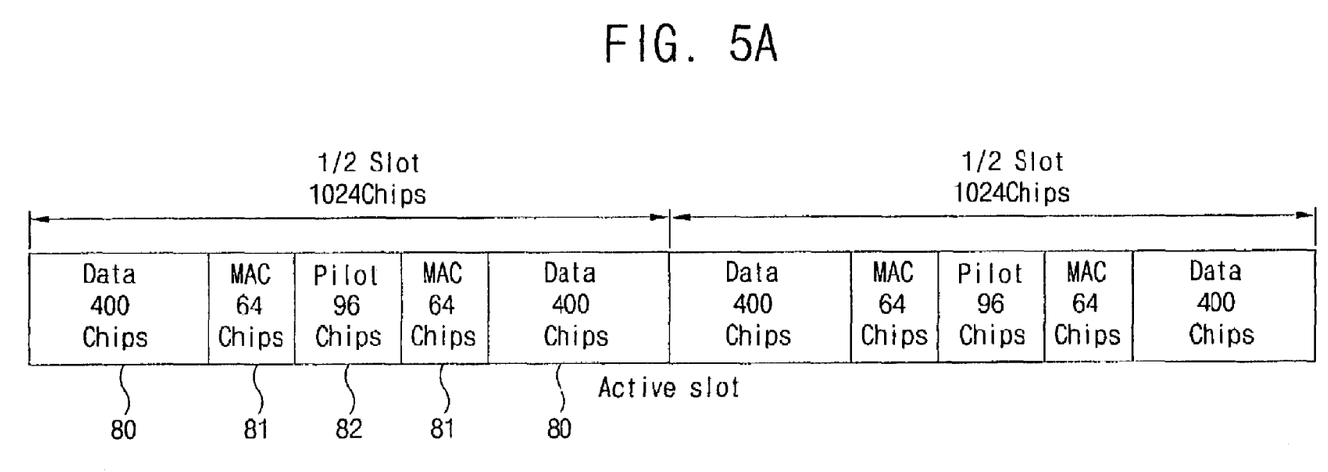
FIGS. 5a and 5b are views showing a forward channel structure used in an HDR mobile communication system.
Figure 5B:
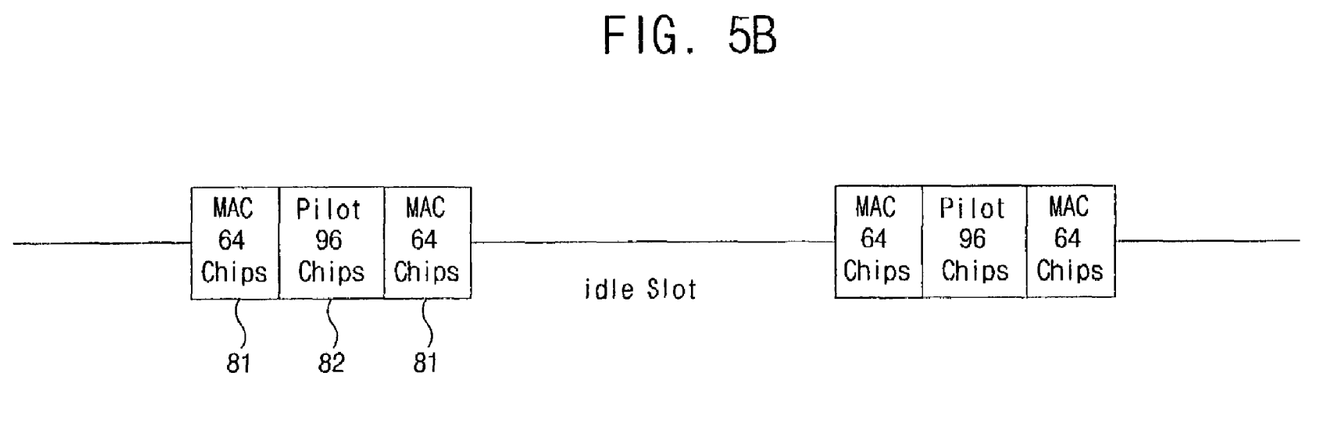

FIGS. 5a and 5b show a forward channel structure used in an HDR mobile communication system. This structure includes a plurality of slots, at least one slot corresponding to a data channel 80, a media access control (MAC) channel 81, and a pilot channel 82. In a time division multiplexing (TDM) method, all physical channels are transmitted to one channel in the forward channel. The pilot channel is used as a reference channel for coherent detection of a base station, the MAC channel is used for transmitting transmission rate controlling information, and the data channel is used for transmitting control information for controlling call processing or actual useful information.

The HDR mobile communication system does not provide same data rate to all users, but provides changeable data rates according to a C/I (carrier to interference ratio) of the pilot channel in the forward channel. That is, the mobile station uses the pilot channel as a reference of coherent detection for demodulating the MAC channel and the data channel, measures the C/I of the pilot channel, and requires data transmission rate of forward direction to the base station. Therefore, in an area where the C/I of the pilot channel is high, connection can be made at the highest rate. In an area where the C/I of the pilot channel is inferior, connection is made at a lower rate. The receiving function of the mobile station thus greatly affects the function of the entire system. Therefore, it is strongly recommended that a diversity apparatus be included in the mobile station of an HDR mobile communication system.

It is also noted that when phase shifting is performed for switching and in-phase combination is performed by the mobile station diversity apparatus in a data channel or a MAC channel, an error may be generated on coherent detection because of the sudden phase change. This error maybe increased when the data is demodulated, thereby adversely affecting the function of entire system.

However, if the mobile station diversity apparatus performs the switching and phase shift operations at the moment the pilot channel begins, the mobile station is able to identify the degree of change of the C/I of the pilot channel based on the switching or phase shift, and also is able to perform an estimation of phase and size for coherent detection for the pilot channel.

According to at least one embodiment of the present invention, the phase shift or switching operation is performed at the moment the pilot channel or a preamble signal is started, in a system which uses a forward radio channel in which the pilot channel or preamble signal is used for synchronizing. This for example, may be performed in an HDR mobile communication system to prevent error in an actual data channel from being generated.

Figure 6:
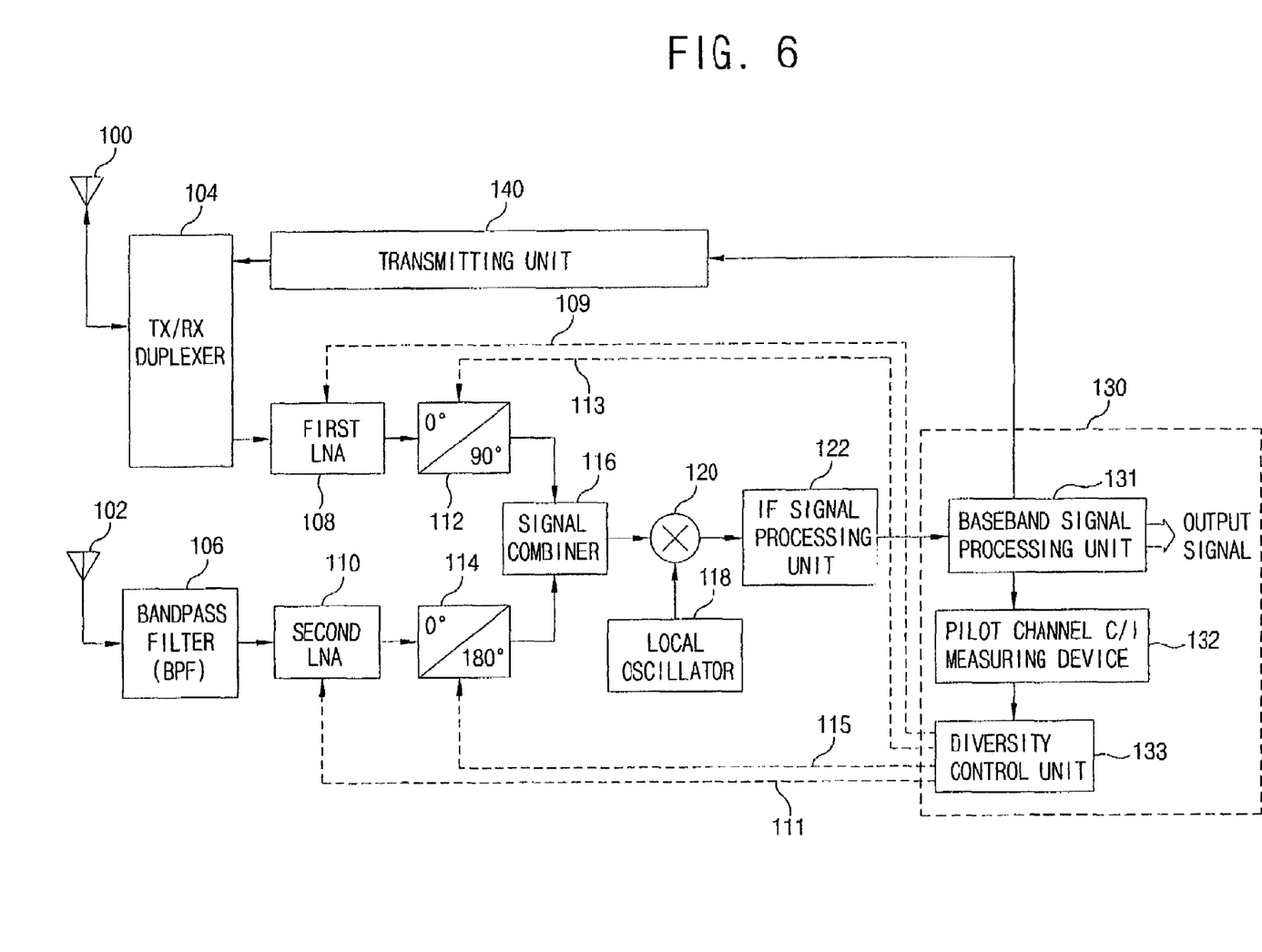
FIG. 6 is a view showing a receiving diversity apparatus of a mobile station in an HDR mobile communication system according to a preferred embodiment of the present invention.

FIG. 6 shows a receiving diversity apparatus in a mobile terminal of an HDR mobile communication system according to a performed embodiment the present invention. This apparatus includes first and second antennas 101 and 102, a transmit/receive duplexer 104, a bandpass filter (BPF) 106, first and second low noise amplifier (LNA) 108 and 110, first and second phase shifters 112 and 114, a signal combiner 116, a local oscillator 118, a mixer 120, an intermediate frequency signal processing unit 122, a received signal processing unit 130, and a transmitting unit 140.

The Tx/Rx duplexer 104 is connected to the first antenna for dividing the transmission signal and received signal, the first LNA 108 amplifies the first received signal output from the Tx/Rx duplexer 104 according to a first gain control signal, and the BPF 106 filters the signal of desired band from the second received signal received through the second antenna 102. The second LNA 110 amplifies the filtered second received signal according to a second gain control signal. The first phase shifter 112 performs a phase shift of the first received signal output from the first LNA 108 at 0° and 90° degrees according to a first phase control signal, and the second phase shifter 114 performs a phase shift of the second received signal output from the second LNA at 0° and 180° degrees according to a second phase control signal.

The signal combiner 116 combines the first and second received signals from the first and second phase shifters. The local oscillator 118 generates a local oscillating frequency, and the mixer 120 converts the signal from the signal combiner into an intermediate frequency signal using the local oscillating frequency. The intermediate frequency signal processing unit 122 then processes the converted intermediate frequency signal, and outputs the signal to the received signal processing unit 130.

The received signal processing unit 130 despreads the intermediate frequency signal, measures the C/I of the despread pilot channel, selects one of the in-phase combining diversity operation and the selection diversity operation according to the measured C/I of the pilot channel, and detects the channel changing status. The received processing unit then controls the maintaining time of the selected diversity operation according to a sensed channel changing status. The transmitting unit transmits the transmitting signal to the Tx/Rx duplexer.

The received signal processing unit comprises a baseband signal processing unit 131, a pilot C/I measuring device 132, and a diversity control unit 133. The baseband signal processing unit converts and despreads the intermediate frequency signal output from the intermediate frequency signal processing unit. The pilot channel C/I measuring device measures the C/I of the pilot channels in the respective antennas which are despread from the baseband signal processing unit 131, and senses the changing status of the pilot channel in the presently selected antenna A diversity control unit 133 controls operations of the in-phase combining diversity and the selection diversity based on the measured C/I of the pilot channel, and decides the maintaining time of the selected diversity operation according to the sensed pilot channel changing status.

In operation, the receiving diversity apparatus in the mobile station according to the present invention despreads the received signals of the respective antennas, measures the C/I of the respective pilot channels, and then selects the in-phase combining diversity operation or the selection diversity operation based on the measured C/I of the respective pilot channels.

The time for maintaining the selected diversity receiving operation is preferably not fixed, but rather is performed adaptively based on the changing status of the sensed pilot channel. That is, the mobile station receiving diversity apparatus reduces the time for maintaining the selected diversity operation when a changed amount of the measured C/I value of the presently received pilot channel is large, and increases the maintaining time when the changed amount of the C/I value of the pilot channel is small. Therefore, according to environment change of the radio channel, the time for maintaining the optimal diversity operation is decided.

Figure 7:
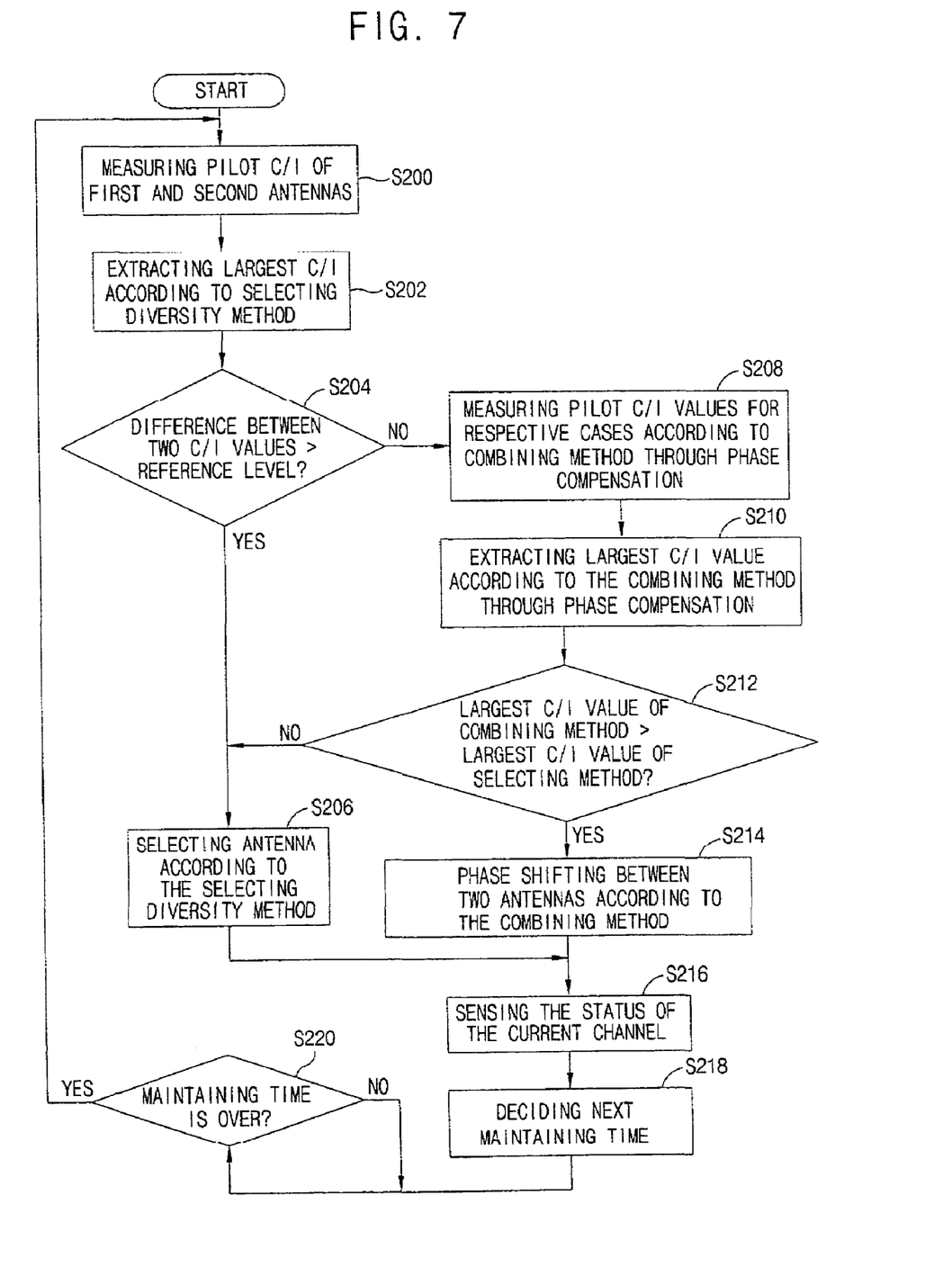
FIG. 7 is a view showing steps included in a receiving diversity method of a mobile station in an HDR mobile communication system according to a performed embodiment of the present invention.

FIG. 7 shows steps included in a receiving diversity method preferably performed in a mobile station of an HDR mobile communication system according to an embodiment of the present invention.

First, the baseband signal processing unit 131 of the received signal processing unit 130 despreads the forward channel received into the first antenna 100, and the pilot channel C/I measuring device 132 measures the C/I of the pilot channel in the despread forward channel. Also, the baseband signal processing unit 131 despreads the forward channel received in the second antenna 102, and the pilot channel C/I measuring device measures the C/I of the pilot channel in the despread forward channel (S200).

When the C/I of the pilot channel in the forward channel is measured for the first antenna, the diversity control unit 133 of the received signal processing unit enables the first gain control signal 109 to operate the first LNA 108 and disables the second gain control signal 111 to switch off the second LNA 110. Then, the diversity control unit disables the first gain control signal 109 and enables the second gain control signal. Thereby, the pilot channel C/I measuring device is able to measure the C/I of the pilot channel in the forward channel received in the second antenna The received signal processing unit switches off the LNA on the unused antenna to minimize the power consumption of the receiving diversity apparatus.

The diversity control unit compares the C/I of the pilot channel of the first antenna to the C/I of the pilot channel of the second antenna and extracts the larger C/I (the largest C/I of pilot channel) (S202). At that time, the diversity control unit identifies whether or not the difference between the two C/I values is larger than a reference level (S204). The reference level can be set as a maximum difference between the pilot channel C/I of the respective antennas, by which the SNR of a combined signal in in-phase combining diversity can be decided to be in a good condition.

When the difference between the C/I values of the two pilot channels is larger than the reference level, the diversity control unit selects the selection diversity operation after deciding that the signal quality of the selection diversity receiving operation is higher than that of the in-phase combining diversity receiving operation. That is, the diversity control unit selects the antenna of larger pilot channel C/I between the two pilot channel C/I values.

If the first antenna is selected, the diversity control unit of the received signal processing unit enables the first gain control signal to operate the first LNA 108, and the receiving diversity apparatus of the mobile station demodulates the received signal received into the first antenna (S206). The receiving diversity apparatus of the mobile station maintains the presently selected receiving operation, that is, the operation of receiving the signal of the first antenna in the selection diversity method for the present maintaining time. During processing the received signal of the first antenna, the pilot channel C/I measuring device 132 of the received signal processing unit measures the C/I of the pilot channel received through the presently selected first antenna, and detects the radio channel changing status according to the changed amount of the C/I (S211).

In step S204, if the difference between the two C/I values of the pilot channels is not larger than the reference level, the diversity control unit 133 chooses the in-phase combining diversity operation rather than the selection diversity operation. Then, the diversity control unit of the received signal processing unit controls the first and second phase control signals 113 and 115 so that the received signals of the first and second antennas and can be combined with phase differences of 0°, 90°, 270° and 180°. The pilot channel C/I measuring device 132 measures the C/I of the pilot channels respectively for the above four cases (S208).

The receiving diversity apparatus of the mobile station preferably performs the phase shift in order the of 0°, 90°, 270° and 180° phase differences to prevent the phase from being compensated by the first and second phase shifters 112 and 114 simultaneously for the signal stability.

In the first of the above four cases, the received signals of the first and second antennas are not phase compensated (phase shifted) (compensated with 0° phase difference). In the second case, the signals are compensated with 90° phase difference and combined. In the third case, the signals are compensated with 270° phase difference and combined. In the fourth case, the 180° phase difference and combined. At that time, the received signal processing unit enables the first gain control signal 109 and the second gain control signal 111 all, so that the received signals of the first antenna and of the second antenna can be combined.

The received signal processing unit compares the C/I values of the pilot channels in the above four cases to extract the C/I of the largest pilot channel (S210).

The received signal processing unit compares the C/I value of the largest pilot channel by in-phase combining to the C/I value of the largest pilot channel by the selection diversity extracted from the step S202 (S212). If the largest pilot channel C/I value by the in-phase combination is not larger than the largest pilot channel C/I value by the selection diversity, the received signal processing unit proceeds to step S206 to perform the selection diversity operation.

If the largest pilot channel C/I value by the in-phase combination is larger than the largest pilot channel C/I value by the selection diversity, the received signal processing unit performs the in-phase combining diversity corresponding to the largest pilot channel C/I value (S214). That is, then the largest pilot channel C/I value by the in-phase combining is the second case where the signals are compensated with 90° phase difference and combined, the received signal processing unit receives the received signals of the first antenna and of the second antenna in the in-phase combining diversity method according to the second case.

The receiving diversity apparatus of the mobile station maintains the decided diversity receiving operation, that is, the operation of receiving the signals of the first and second antennas in the in-phase combining diversity method according to the second case for the present maintaining time.

During the in-phase combining diversity process according to the second case, the pilot channel C/I measuring device 132 of the received signal processing unit measures the C/I of the pilot channel in the processed receiving signals and senses the radio channel changing status according to the changed amount of the measured C/I in the pilot channel (S216).

In an actual radio channel environment, the radio channel is changed at any time by a locational property of the mobile station and moving rate, etc. Therefore, the time for maintaining the decided diversity receiving operation should be changed according to changes in the radio channel environment. Thus, the received signal processing unit decides a next maintaining time for maintaining the diversity receiving operation according to the changing status of the radio channel (S218).

For example, when the mobile station is located on vast plane area in stopped status, the radio channel status is changed slowly and the changed amount of the pilot channel C/I is small. When the changed amount of the pilot channel C/I is small, the maintaining time for maintaining the decided diversity receiving operation is increased. Also, when the mobile station is located in a moving vehicle on urban area, the radio channel status is changed quickly and the changed amount of pilot channel C/I is large. When the changed amount of the C/I is large, the maintaining time is reduced.

The received signal processing unit identifies whether or not the present maintaining time is over, and maintains the present diversity operation when the maintaining time is not over. If the maintaining time is over, the received signal processing unit proceeds to step S200 and starts the process of measuring the pilot channel C/I values in the respective antennas, for determining the receiving operation having a higher signal quality between the selection diversity operation and the in-phase diversity operation (S220).

As described above, according to the present invention, the C/I is measured at the starting point of the pilot channel and the diversity operation between the in-phase combining diversity operation and the selection diversity operation can be selectively performed using the measured C/I value.

Also, in the forward radio channel in which a pilot channel or preamble signal for synchronizing exists regularly, optimal diversity receiving status is decided based on the pilot channel or the preamble signal starting point, not based on a discretionary point of the forward radio channel. Accordingly, error generated in the data demodulation process can be significantly reduced.

Also, one of the in-phase combining diversity operation and the selection diversity operation is selectively performed according to changes of the C/I in the respective pilot channels passing through the plurality of antennas. Therefore, optimal diversity receiving status can be maintained.

Also, the time for maintaining the optimal diversity operation is adaptively changed according to changes of the pilot channel in the forward channel which is in the receiving process presently. Thereby, the error in data demodulation can be minimized and the diversity receiving process can be adaptively performed for changes in radio channel environment.

The present invention is able to perform the in-phase combining diversity operation and the selection diversity operation. To thereby significantly improve signal quality in both a fading environment in which the strength of the received signal is changed according to a lapse of time and a static environment in which the strength of the received signal is not changed by a lapse of time.

Also, according to the present invention, the received signal is despread and signal quality is measured based on the C/I of the pilot channel in the despread received signal.

Also, phase shift is performed for respective received signals of the antennas. Therefore, imbalance in average electric power of the received signals, which is caused by phase shifting the received signal of a certain antenna, can be eliminated.

Also, phase shifter and combiner maybe connected next to the amplifier, and therefore the affect of signal loss generated in the phase shifter and combiner throughout the entire diversity apparatus can be minimized.

The present invention does not use the delaying device used in the diversity apparatus by the maximal ratio combining method shown in FIGS. 3 and 4. Thereby, elements for lowering the diversity functions such as loss of electric power in the received signal due to the delaying device, receiving sensitivity lowering attributable to electric power loss, and imbalance in the average receiving power are not generated. Moreover, the entire diversity apparatus can be miniaturized.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A receiving diversity apparatus of a mobile station in a high data rate (HDR) method mobile communication system comprising:
    a first amplifier for switching a received signal of a first antenna according to a first gain control signal;
    a second amplifier for switching a received signal of a second antenna according to a second gain control signal;
    a first phase shifter for shifting phase of an output signal of the first amplifier according to a first phase control signal;
    a second phase shifter for shifting phase of an output signal of the second amplifier according to a second phase control signal;
    a combiner for combining output signals of the first and second phase shifters; and
    a received signal processing circuit for measuring signal quality of a pilot channel from the output signal of the combiner and for controlling a diversity receiving status according to the measured signal quality of the pilot channel,
    wherein the received signal processing circuit selects a first diversity operation when the measured signal quality of the pilot channel falls within a first predetermined range and selects a second diversity operation different from the first diversity operation when the measured signal quality of the pilot channel falls within a second predetermined range,
    wherein the received signal processing circuit decides a time for maintaining the selected optimal diversity operation according to a changed amount of the measured signal quality, and
    wherein the received signal processing circuit comprises:
    a baseband signal processing circuit for converting and despreading the output signal of the combiner into a baseband signal;
    a pilot channel C/I measuring circuit for measuring C/I values of pilot channels on the respective antennas outputted from the baseband signal processing circuit and sensing changing status of a presendy received pilot channel; and
    a diversity control circuit for selecting the first diversity receiving operation or the second diversity receiving operation according to the measured signal quality and deciding the maintaining time of the selected diversity receiving operation according to the changing status of the pilot channel.

2. The apparatus of claim 1, wherein the pilot channel exists on a forward channel regularly.

3. The apparatus of claim 1, wherein the signal quality of the pilot channel is decided by a C/I measured value of the pilot channel.

4. The apparatus of claim 1, wherein the first phase shifter performs phase shifts of 0° and 90° according to the first phase control signal.

5. The apparatus of claim 4, wherein the second phase shifter performs phase shifts of 0° and 180° according to the second phase control signal.

6. The apparatus of claim 5, wherein the phase shifts by the first and second phase shifters are performed in phase angles of 0°, 90°, 270° and 180° according to the first and second phase control signals.

7. The apparatus of claim 1, wherein the maintaining time is reduced when a change in a C/I value exceeds a predetermined level and is increased when the change in the C/I value falls below the predetermined level.

8. The apparatus of claim 1, wherein the diversity control circuit selects the first diversity receiving operation or the second diversity receiving operation at a starting point of the pilot channel.

9. The apparatus of claim 8, wherein the diversity control circuit generates the first and second gain control signals and the first and second phase control signals at the starting point of the pilot channel according to the selected diversity receiving operation.

10. The apparatus of claim 1, wherein the first diversity operation is a selection diversity operation and the second diversity operation is an in-phase combining diversity operation.

11. A receiving diversity method of a mobile station in an HDR mobile communication system comprising:
    measuring signal quality of pilot channels on respective antennas;
    measuring the signal quality of one or more of the pilot channels which are combined in the respective antennas by compensated phase differences;
    selecting a diversity receiving operation according to the signal quality of the respective pilot channel, said selecting including selecting a first diversity operation when the signal quality falls within a first predetermined range and selecting a second diversity operation when the signal quality falls within a second predetermined range; and controlling a maintaining time of the selected diversity operation, wherein selecting the optimal diversity receiving status compnses:

selecting an antenna having C/I value of the largest pilot channel if the C/I values of the pilot channels have difference larger than a predetermined value;

receiving a received signal from the selected antenna;

selecting in-phase combination of a phase shift corresponding to the C/I value of the largest pilot channel among the C/I values of the in-phase combined pilot channel, when the difference between the C/I values of the pilot channels on the respective antennas is not larger than a predetermined value; and receiving the received signal through the combining process after shifting by the corresponding phase difference according to the selected in-phase combining process.

12. The method of claim 11, wherein the pilot channel exists in a forward channel regularly.

13. The method of claim 11, wherein the signal quality represents a measured value of C/I in a despread pilot channel.

14. The method of claim 11, wherein measuring by compensated phase differences comprises:

measuring the C/I of the respective pilot channels which are in-phase combined for respective compensated phase differences of 0°, 90°, 270° and 180°.

15. The method of claim 11 wherein the selected diversity receiving operation is controlled for the maintaining time.

16. The method of claim 15, wherein the selected diversity receiving operation is performed at a starting point of the pilot channel.

17. The method of claim 11, wherein the first diversity operation is a selection diversity operation and the second diversity operation is an in-phase combining diversity operation.

18. A receiving diversity method of a mobile station in an HDR mobile communication system comprising:

measuring signal quality of pilot channels on respective antennas;

measuring the signal quality of one or more of the pilot channels which are combined in the respective antennas by compensated phase differences;

selecting a diversity receiving operation according to the signal quality of the respective pilot channel, said selecting including selecting a first diversity operation when the signal quality falls within a first predetermined range and selecting a second diversity operation when the signal quality falls within a second predetermined range; and controlling a maintaining time of the selected diversity operation, wherein controlling the maintaining time comprises:

sensing changed amount of the C/I of a presently received pilot channel;

reducing the maintaining time when a change in the C/I exceeds a predetermined level; and increasing the maintaining time when the change in the C/I is below the predetermined level.

19. A receiving diversity method of a mobile station in an HDR mobile communication system comprising:

measuring C/I value of a pilot channel on a first antenna;

measuring C/I value of pilot channel on a second antenna;

receiving a signal through the antenna having a larger pilot channel C/I value when a difference between the C/I values of the pilot channels on the first and second antennas is larger than a predetermined level; and in-phase combining pilot channels of the first and second antennas when the difference between the C/I values of the two pilot channels is not larger than the reference level, wherein said in-phase combining comprises:

measuring C/I values of the in-phase combined pilot channels by compensated phase angles;

extracting a largest C/I value among the C/I values of the in-phase combined pilot channels measured above;

comparing said larger pilot channel C/I value to the extracted C/I value; and receiving the received signal through the in-phase combination of phase angle compensation corresponding to the extracted C/I value based on the comparison, and wherein the received signal is received through the antenna having the first pilot channel C/I value when the extracted C/I value is not larger than the first pilot channel C/I value.

20. The method of claim 19, further comprising:

selecting a diversity receiving operation based on at least one of the C/I values of the pilot channel of the first or second antennas, said selecting including selecting a fast diversity operation when said at least one C/I value falls within a first predetermined range and selecting a second diversity operation when said at least one C/I value falls within a second predetermined range.

21. The method of claim 20, wherein the first diversity operation is a selection diversity operation and the second diversity operation is an in-phase combining diversity operation.

* * * * *